Figure 7:
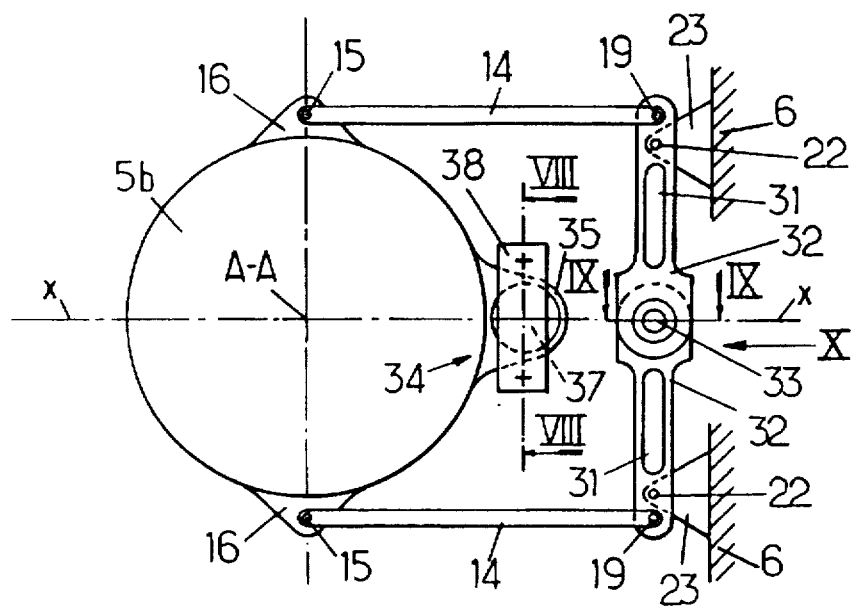

United States Patent [19]

Mouille

[11] Patent Number: 5,782,430
[45] Date of Patent: Jul. 21, 1998

[54] DEVICE FOR ANTIVIBRATORY SUSPENSION OF A HELICOPTER ROTOR

[75] Inventor: René Louis Mouille, Aix-en-Provence, France

[73] Assignee: Eurocopter France, Marignane Cedex, France

[21] Appl. No.: 682,712
[22] PCT Filed: Dec. 22, 1995
[86] PCT No.: PCT/FR95/01728
 § 371 Date: Sep. 24, 1996
 § 102(e) Date: Sep. 24, 1996
[87] PCT Pub. No.: WO96/20107
 PCT Pub. Date: Jul. 4, 1996

[30] Foreign Application Priority Data

Dec. 23, 1994 [FR] France .................. 94 15591

[51] Int. Cl.⁶ ...................................... B64C 27/51
[52] U.S. Cl. .................. 244/17.27; 244/54; 248/559
[58] Field of Search ............... 244/17.11, 17.27, 244/54; 411/500, 30; 188/379, 380; 248/556, 557, 559

[56] References Cited

U.S. PATENT DOCUMENTS 3,920,202 11/1975 Mouille .
3,921,940 11/1975 Mouille .
4,431,148 2/1984 Mouille .
4,458,862 7/1984 Mouille .
4,500,054 2/1985 Osborn ........................ 244/17.27
4,720,060 1/1988 Yana ........................... 244/17.27
5,190,244 3/1993 Yana ........................... 244/17.27

Primary Examiner—Galen L. Barefoot
Attorney, Agent, or Firm—Larson & Taylor

[57] ABSTRACT

The suspension device comprises, for linking the base (5b) of the transmission gearbox to the fuselage (6), two parallel rods (14), articulated (15) onto lateral supports (16) fixed to opposite sides of the base (5b) and extending on the same side of the transmission gearbox to their link (19) to structural supports (20) of the fuselage (6). Elastic links (17) provide the suspension at least in the direction perpendicular to the rods (14). In a variant, the rods (14) are linked to the fuselage (6) being articulated on a transverse flexible bar, equipped as required with a central flapping mass, or on transverse levers articulated onto one another by a central articulation and onto the structure. Application to uni-or bidirectional, focal-point and, as appropriate, antiresonant suspension of helicopter main rotors.

21 Claims, 4 Drawing Sheets

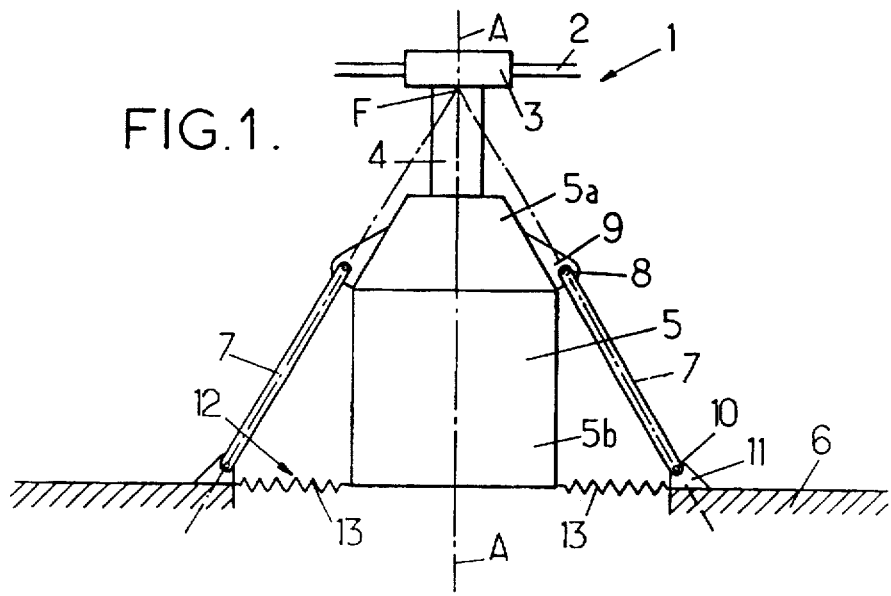
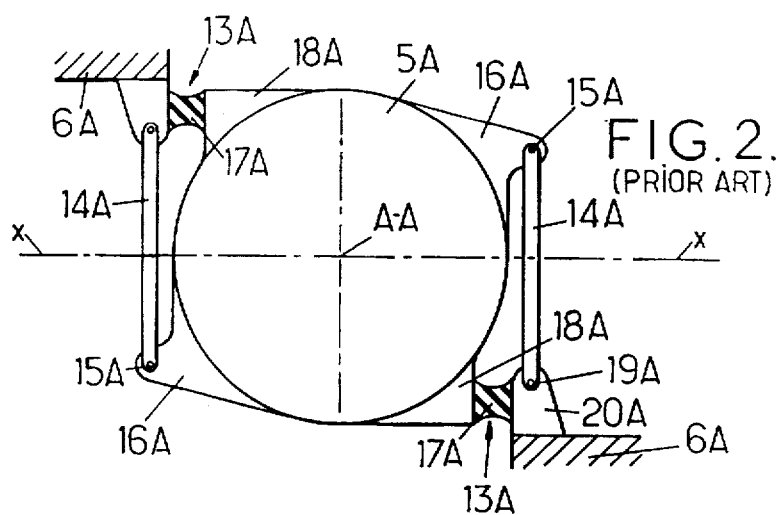
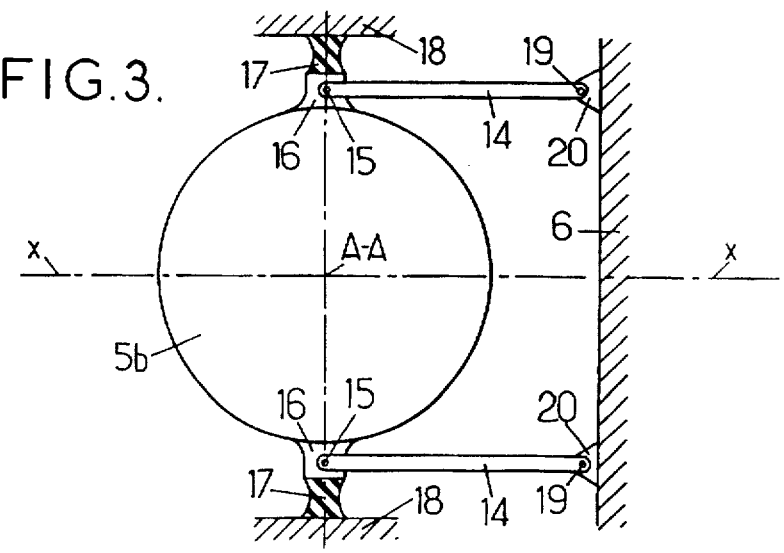

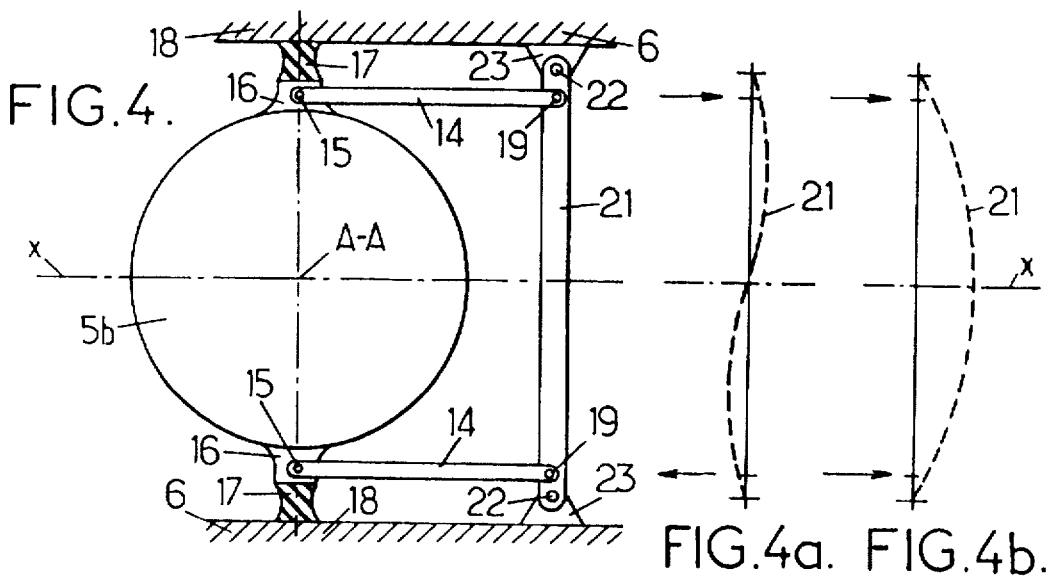
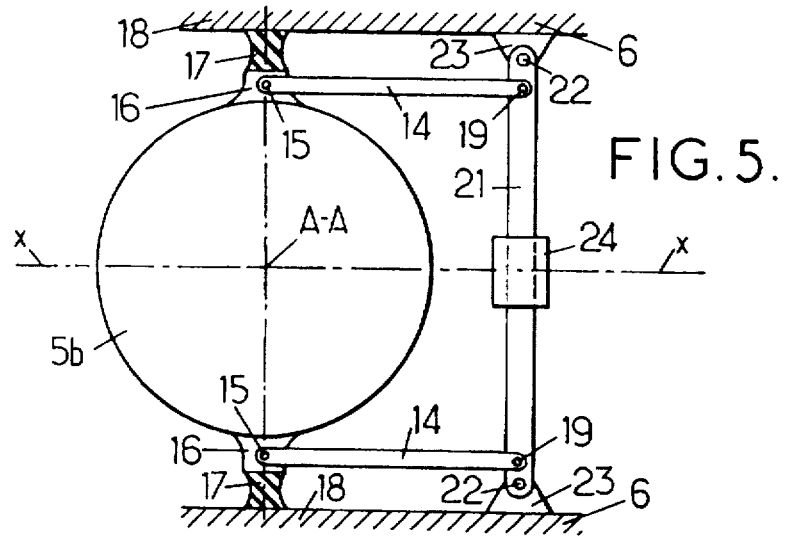
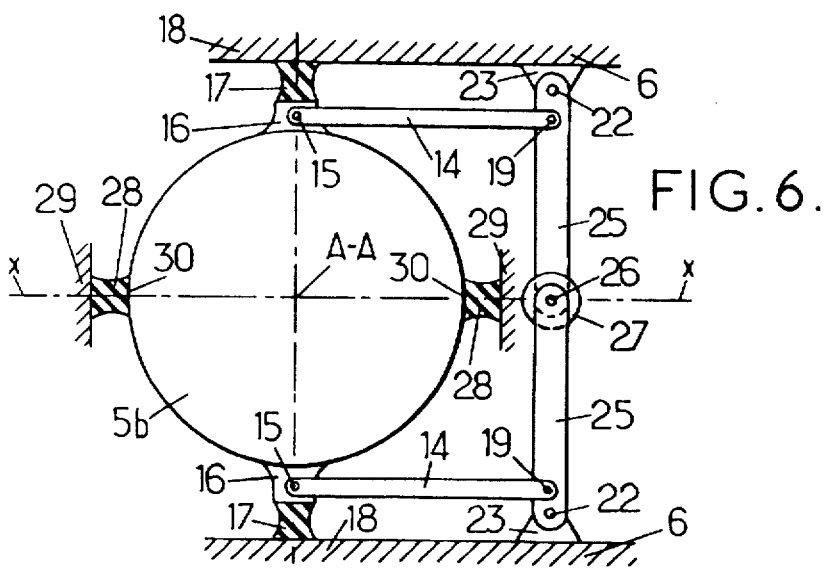

5,782,430

1

DEVICE FOR ANTIVIBRATORY SUSPENSION OF A HELICOPTER ROTOR

The invention relates to a device for antivibratory suspension of a rotor, in particular a main or lifting rotor, of a helicopter on the fuselage thereof, that is to say a suspension device intended to filter vibration between the rotor and the fuselage.

In general, on helicopters, the main rotor, or each main rotor, is integral in rotation with a rotor mast or shaft supported and driven in rotation about its axis, which constitutes the axis of rotation of the rotor, by a gearbox known as main gearbox, coaxial with the rotor mast about the axis of rotation, and linked by at least one transmission shaft to a power plant, supported by the structure of the fuselage of the helicopter, in general on an upper part of the fuselage called transmission support platform, on which is also mounted the assembly consisting of the main gearbox, of the mast and of the rotor.

By reason, essentially, of the alternating forces which are exerted on the components of the rotor while it is rotating, the abovementioned assembly has to be mounted on the fuselage by means of a suspension device filtering the vibration transmitted from the rotor to the fuselage, and in particular the excitations which are longitudinal (with respect to the helicopter) and transverse or lateral, which are the most troublesome.

Amongst the numerous known devices for antivibratory suspension of a helicopter rotor, the devices of the type known as "focal point" type and those of the type known as "antiresonant" type have been the subject of various proposals and embodiments.

A particular focal-point suspension device is described in U.S. Pat. No. 3,698,663 and comprises:

a set of at least three straight and rigid suspension bars, distributed around the transmission gearbox and arranged obliquely with respect to the axis of rotation, so as to converge toward the axis of rotation, at a point known as "focal point", each bar being linked by one end to the transmission gearbox and articulated by its other end to a structural support of the fuselage, and a device linking the base of the transmission gearbox to the fuselage, allowing transfer to the fuselage of the torque in reaction to the torque driving the rotor by the transmission gearbox as well as the movements of the transmission gearbox with respect to the fuselage with flexibility in at least one direction perpendicular to the axis of rotation in order to filter vibration between the rotor and the fuselage.

In a suspension device of this type, the abovementioned assembly of the main transmission gearbox, of the mast and of the rotor is thus attached to the structure of the fuselage by the set of oblique bars converging at the focal point, around which this suspended assembly can oscillate.

Various focal-point suspension devices, known particularly from U.S. Pat. No. 3,698,663 as well as from FR 2 228 662 and FR 2 232 481, differ from one another in the embodiment of the linking device linking the base or the bottom of the transmission gearbox to the structure of the fuselage.

Thus the "Gazelle" helicopter, from the company AEROSPATIALE Societe Nationale Industrielle, is equipped with an antivibratory suspension device of this type in which, as also described in U.S. Pat. No. 3,698,663, the device linking the base of the transmission gearbox to the fuselage comprises, on the one hand, two identical rods, substantially parallel and extending substantially in the same plane perpendicular to the axis of rotation, one end of each rod being linked to a structural support of the fuselage while its other end is articulated onto one of two lateral supports respectively, fixed to opposite sides of the transmission gearbox, and, on the other hand, at least one elastic link including at least one element for elastic return in at least said direction perpendicular to the axis of rotation and also perpendicular to the direction of the rods, the elastic return element being fixed between a structural support of the fuselage and a lateral support of the base of the transmission gearbox.

The device of the "Gazelle" helicopter exhibits drawbacks, mentioned below, since, as represented in FIG. 2, the two rods 14A, working in tension in order to transmit the torque in reaction (to the drive torque of the rotor) from the base of the transmission gearbox 5A to the structure of the fuselage 6A, are arranged on either side of the radial plane passing through the axis of rotation A—A, at the center of the transmission gearbox 5A, and through the centers of the articulations 15A of the rods 14A on the lateral supports 16A diametrally opposed on the base of the transmission gearbox 5A, and the device linking this base to the structure of the fuselage 6A comprises a pair of elastic links 13A diametrally opposed with respect to the axis A—A and each comprising an element 17A for elastic return of the box 5A in the direction perpendicular to the axis A—A and to the direction of the rods 14A, each element 17A being an elastomer stud fixed, on the one hand, onto one of two lateral supports 18A respectively, which are diametrally opposed on the base of the transmission gearbox 5A, and, on the other hand, on one of the two structural supports 20A respectively for attaching to the fuselage 6A on which the rods 14A are articulated at 19A.

With the latter being arranged transversely with respect to the helicopter, the suspension is single directional and longitudinal, given that the elastomer studs 17A are elastically deformed in tension-compression in order to filter the longitudinal excitation of the transmission gearbox 5A.

Such an embodiment has the drawback of not providing bidirectional suspension, and thus of not filtering the transverse excitation, and its architecture does not lend itself simply, reliably and economically to adaptation providing bidirectional suspension.

In contrast, in U.S. Pat. No. 3,698,663, the rods extend on the same side of a plane substantially parallel to the axis of rotation and passing through the centers of the articulations of the rods onto the gearbox, so that one of the rods is stressed in tension and the other in compression for transfer of said reaction torque to the fuselage. Moreover, the end of the rods which is not articulated onto the gearbox is articulated onto the free end of one of two radial arms respectively, each projecting on the same side close to one of the two ends respectively of a torsion tube which is transverse (with respect to the rods), mounted in rotation by its ends around its axis, substantially perpendicular to the axis of the rotor and to the rods, on two structural supports of the fuselage, being elastically returned toward an initial position.

This device achieves high stiffness in terms of torque through the rods, one stressed in tension and the other in compression, and which, with the torsion tube, which the rods stress with substantially the same torsion moment but in opposite directions, constitute an entirely mechanical main kinematic chain, providing locking in torque, without presenting the danger of damage, particularly by hydraulic oils, the torque restraint being independent of the longitudinal and transverse movements of the base of the gearbox, which are damped by a secondary kinematic chain, comprising elastic link means providing bidirectional suspension.

In U.S. Pat. No. 3,698,663, these elastic link means, for providing the elastic link perpendicularly to the rods, comprise two further rods each articulated to the base of the gearbox by one end, and the other end of which is linked to a structural support of the fuselage by an elastomer element, providing lateral return, while the longitudinal return, or the elastic link substantially parallel to the rods, is provided by two elastomer elements, each of which is mounted between a structural support of the fuselage and one end of one of two further rods respectively, each articulated by its other end onto the free end of one of two further arms respectively, projecting radially on the torsion tube, and each in the diametral extension and on the side opposite one of the first two radial arms respectively which are integral in rotation with the torsion tube, and onto the free end of each of which is articulated one of two rods respectively, linked to the gearbox.

With this architecture, it will be understood that a torsion tube of modest size suffices to provide high rigidity in torque, if the rods linked to the gearbox stress the torsion tube with very short lever arms.

However, by construction, it is not possible to give these lever arms as short a length as desirable, and these lever arms are extended by those of the elastic link means in the direction of the rods, so that the size of the device, parallel to the axis of the rotor, remains considerable. It results therefrom that the rods of the main kinematic chain cannot be articulated onto the gearbox in its base region, and that the lever arms, rods and elastomer elements of the means for elastic linking in the direction of the rods have to be housed under the transmission support platform, which complicates assembly and accessibility for maintenance. Moreover, it is intricate and expensive to articulate the torsion tube onto the fuselage and the main rods onto the torsion tube in such a way that the forces in the rods are perfectly in opposition, and the torsion tube is stressed by alternate and opposing stresses which are very prejudicial to its life expectancy. Another drawback of this known device is its weight and its bulk due to the fact that, in addition to the two main rods, it includes two further pairs of rods of the elastic link means.

Moreover, antivibratory suspension devices of the antiresonant type, embodiments of which are described in the French Patents FR 2 474 996 and FR 2 499 505, have a device for linking the base of the gearbox to the structure of the fuselage, which comprises a plate fixed to attachment points on the structure of the fuselage as well as to the bottom of the gearbox, and flapping masses at the free ends of flexible levers integral with radial arms linked directly or indirectly to the plate and/or to the gearbox as well as to the points for attaching the plate to the structure of the fuselage, so as considerably to reduce the alternating reactions in the region of these attachments, and thus to filter the corresponding vibration.

One object of the invention is to propose improvements to the antivibratory suspension device of the focal-point type, as known from U.S. Pat. No. 3,698,663, and capable of being easily configured into a uni- or bidirectional suspension, and in which the principle of focal-point suspension can be used alone, but completely clearing the underside of the gearbox and the transmission support platform, and offering as much stiffness in terms of torque as in U.S. Pat. No. 3,698,663, achieved by a main kinematic chain of lesser height, above the transmission support platform of the fuselage, or in combination with the principle of antiresonant suspension, without the device exhibiting the complexity of the structure of the known antiresonant type devices.

Another object of the invention is to propose such a device requiring only a minimum of attachment points on the structure of the fuselage, being easy to maintain, by virtue of simplified interfaces with the gearbox and with the fuselage, while being very reliable.

Finally another object of the invention is to propose such a device including elastic link means which are simple, economical and easy to maintain.

To this end, the invention proposes a focal-point antivibratory suspension device of the abovementioned type, which is characterized in that the ends of the rods linked to structural supports of the fuselage are articulated directly onto these supports, preferably by ball-joint articulations. Thus a unidirectional suspension device is obtained, with an entirely mechanical main kinematic chain, which is very simple, very accessible and of very low height on the transmission support platform, completely clearing the bottom of the gearbox, and which, by the arrangement of the rods longitudinally on the helicopter, and advantageously toward the rear of the gearbox, according to one very favorable installation on the transmission support platform of the fuselage of the helicopter, makes it possible to provide transverse suspension, filtering the lateral excitation, which is most troublesome for the occupants of the helicopter.

On the basis of the suspension device according to the invention as presented above, it is possible to obtain a bidirectional suspension by articulating the ends of the rods, on the side opposite the gearbox, not directly onto the structural supports of the fuselage but onto a flexible bar, on which each rod is articulated in the region of one of two articulations respectively by which this bar, substantially perpendicular to the rods, is articulated onto these structural supports.

The advantages are preserved of a simple mechanical main kinematic chain, which is accessible and of low height on the transmission support platform, and clearing the underside of the gearbox, but, moreover, in this case, the longitudinal elasticity, or elasticity in the direction of the rods, of the suspension device, is ensured by the deformations of the flexible bar under the longitudinal forces, while, under the torque forces, the S-shaped deformation of the flexible bar greatly reduces the movements of the gearbox, the casing of which is stressed by the torque in reaction to the rotational drive torque of the rotor. The lateral suspension, or suspension in the direction perpendicular to that of the rods, is still provided by the elastic link or links of the device for linking the base or bottom of the casing of the gearbox to the structure of the fuselage, these elastic links possibly, in a known way, comprising elastomer studs.

In particular, if the link device, as already known, comprises a pair of elastic links diametrally opposed with respect to the axis of rotation and each including at least one element for elastic return in the direction perpendicular to that of the rods, it is advantageous, according to the invention, for each elastic link to be fixed to one of the lateral supports respectively of the gearbox onto which one of the two rods respectively is articulated.

In embodiments with a flexible bar, according to the invention, so as to obtain the elasticity sought with a higher strength of the bar in terms of bending, it is advantageous for the articulations of the rods onto this flexible bar to be arranged between the articulations of the flexible bar onto the structural supports of the fuselage.

A bidirectional suspension device with a flexible bar according to the invention can also be adapted into a combined suspension device, of the focal-point type in the direction perpendicular to the rods and of the antiresonant type in the direction of the rods, if the flexible bar has a flapping mass located at its center. This embodiment makes it possible to reduce the alternating reactions at the attachments of the bar onto the structure and simultaneously to increase the rigidity of the bar in order to increase its resistance to the torque forces.

However, if the dimensioning of the bar is not possible, having regard to the available space, the bar, made rigid and strong, is cut at its center to form two levers, and the ends of the rods linked to structural supports of the fuselage are each articulated onto one of the two rigid levers respectively, aligned substantially in the extension of one another and substantially perpendicular to the rods, and each articulated onto one of the structural supports respectively of the fuselage, in the vicinity of the articulation of said lever onto the corresponding rod, the two levers being moreover articulated onto one another at their adjacent ends by a central articulation, between the rods, without elastic link from the central articulation to the gearbox, or even possibly without stressing of the central articulation by an elastic link in the direction of the rods.

In this case, a concentrated mass can be fixed in the region of the central articulation of the two levers, and the elasticity in the direction of the rods is completely dissociated from the two levers and can be provided by a second pair of elastic links of the link device. Each elastic link of this second pair comprises at least one element for elastic return in the direction of the rods, and is fixed onto one of two structural supports respectively of the fuselage, which are arranged substantially in the radial plane passing through the axis of rotation and parallel to the rods. Each of these elastic links is also fixed to one of two supports respectively which can be arranged laterally in positions diametrally opposed on the base of the gearbox or, possibly, on either side of the mass and of the central articulation of the levers.

In a variant embodiment, also dissociating the problem of strength of the bar subdivided into two levers from the problem of its elasticity in the direction of the rods, a concentrated mass according to the preceding embodiment can be distributed over the two levers, in such a way that each of them has an increased mass in its part adjacent to the central articulation, and to which another mass can possibly be added, remaining concentrated, and fixed to the central articulation.

The device according to the invention can also be configured into a device with suspension laterally having a focal point (or device with transverse unidirectional suspension with a focal point), that is to say perpendicularly to the direction of the rods, and into a device with suspension activated longitudinally, that is to say in the direction of the rods. To this end, the two rigid levers, without a mass located on their central articulation or distributed in their part adjacent thereto, are stressed, in the region of their central articulation, by at least one actuator tending to shift the central articulation in the direction of the rods, and capable of operating as a recentering device, tending to maintain the two levers aligned. This actuator can be a linear jack, mounted between the central articulation of the two levers and a structural attachment point of the fuselage, the jack then being aligned on the diametral axis parallel to the rods, and, in an advantageous embodiment, this jack is hydraulic and controlled by a servovalve, which is driven by electrical commands produced in terms of amplitude and in phase particularly from signals originating, for example, from stress sensors in the rods and/or from sensors of vibratory levels in the helicopter cabin.

In the various embodiments with rigid levers, as the strength of the latter no longer poses a problem, it is possible to reduce the size of the device by arranging the articulations of the rigid levers on the corresponding structural supports between the articulations of the rods onto the levers.

Moreover, the central articulation of the two levers onto one another must be able to absorb their virtual elongation, which is slight in practice, when the levers are no longer aligned. To that end, the central articulation advantageously comprises means for compensating for the misalignments of the two levers, such as at least one deformable elastomer element mounted between two parts which are articulated onto one another of the two levers.

In the embodiments including elastic links providing, in some cases, the longitudinal elasticity and, in other cases, the transverse elasticity, it is possible, as a variant, to integrate these various elastic links into a single elastic link including at least one element for elastic return along the direction of the rods and along the direction perpendicular to that of the rods, this return element being fixed onto a structural support of the fuselage arranged substantially in the radial plane parallel to the rods. This elastic link, which confers the longitudinal and lateral elasticities in the device for linking the base of the gearbox to the structure of the fuselage, can be positioned both between the rods as well as on the other side, with respect to the axis of rotation passing through the center of the gearbox. Moreover, such a single elastic link can also be used in place of the elastic links providing only the lateral elasticity, in the simplest variants of the device of the invention.

According to an advantageously simple structure, this single elastic link may comprise two elastomer studs, working in shear mode, and fixed on either side of a common support projecting laterally on the base of the gearbox, each sandwiched between this common support and one of two armatures respectively rigidly linked to an attachment fitting on the fuselage, this single elastic link additionally possibly comprising at least one end stop limiting the deformation of the studs, as can also be the case in the region of each elastic link, when the link device includes several thereof.

Figure 8:
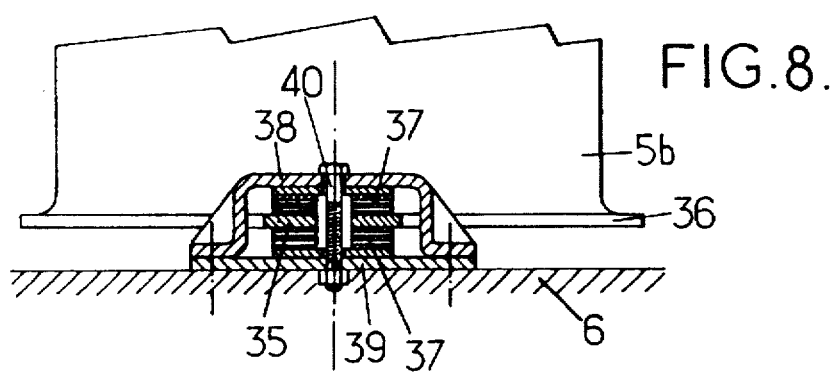
Figure 9:
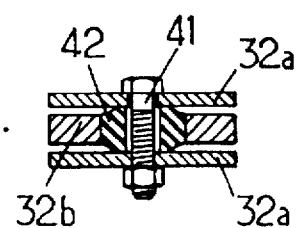
Figure 10:
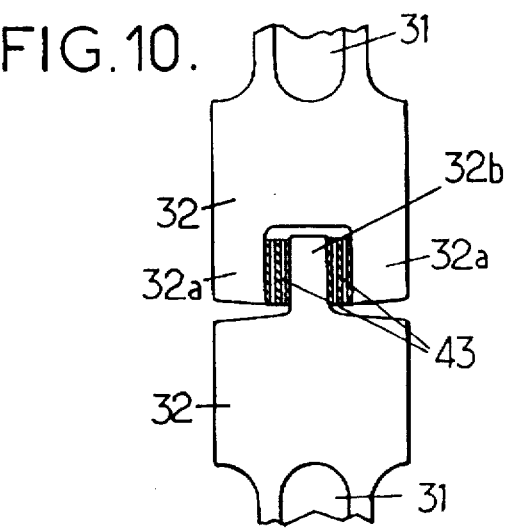
Figure 11:
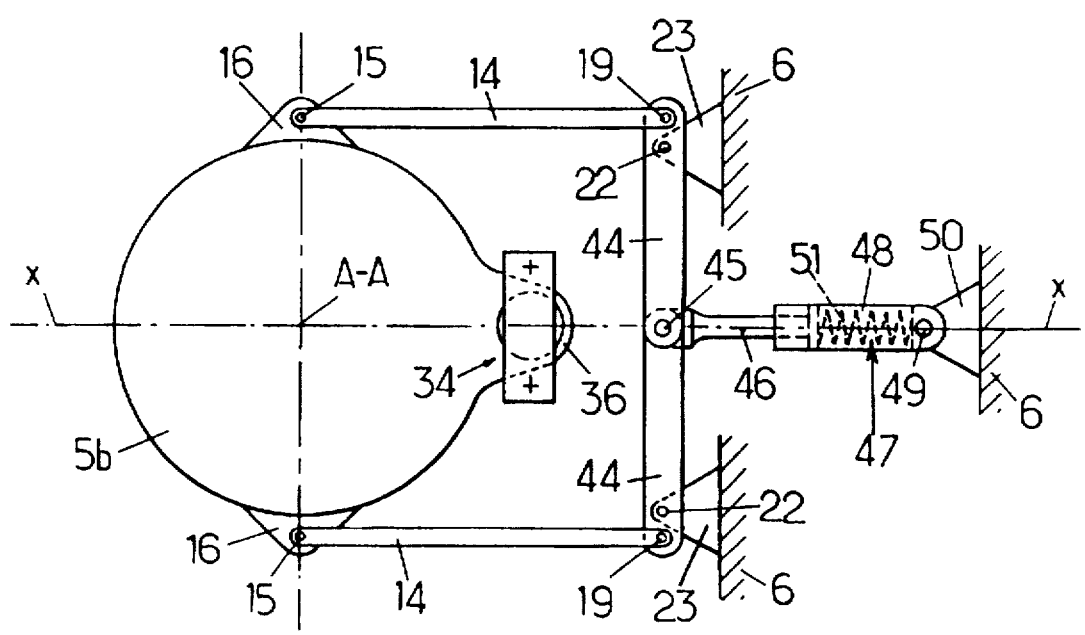

Other characteristics and advantages of the invention will emerge from the description given below, in a nonlimiting way, of example embodiments described by reference to the attached drawings in which:

FIG. 1 is a partial diagrammatic view in side elevation of a focal-point antivibratory suspension device, FIG. 2 is a diagrammatic view in vertical elevation, limited to the device linking to the fuselage from the bottom of the gearbox of a suspension device according to FIG. 1 equipping the "Gazelle" helicopter, and corresponding to the state of the art, FIG. 3 is a view similar to FIG. 2 for a unidirectional and transverse focal-point suspension device according to the invention, FIG. 4 is a view similar to FIG. 3 for a focal-point and bidirectional suspension device, FIGS. 4a and 4b showing the deformations under load of a member providing the longitudinal elasticity, FIG. 5 is a view similar to FIG. 4 for a combined suspension device, focal point type laterally and antiresonant type longitudinally, FIG. 6 is a view similar to FIG. 5 for a variant of the same type of device, FIG. 7 is a view similar to FIG. 6 for another variant of the same type of device, FIG. 8 is section along VIII—VIII of FIG. 7, FIG. 9 is a section along IX—IX of FIG. 7, FIG. 10 is a side view along the arrow X of FIG. 7, and FIG. 11 is a view similar to FIG. 7 for an example of a suspension device, focal-point type laterally and activated longitudinally.

FIG. 1 partly represents a main helicopter rotor 1, the blades 2 of which are linked to a hub 3 integral in rotation with the upper end of a rotor mast 4, which is supported by its base in a main gearbox 5 linked, in a way which is not represented, by a transmission shaft to the power plant of the helicopter. The main gearbox 5 is coaxial with the rotor mast 4 about its axis A—A, and drives it in rotation about this axis, which is the axis of rotation of the rotor. This main gearbox 5 is suspended from the transmission support platform 6, at the upper part of the fuselage of the helicopter, by an antivibratory suspension device which comprises a set of four suspension bars 7. The four bars 7, straight and rigid, are distributed around the box 5 and arranged obliquely with respect to the axis of rotation A—A, so as to converge at the vertex of the box 5 and onto the axis of rotation A—A. These bars 7 are thus arranged like the four oblique corners of a squarebased pyramid segment, for example, which link the large to the small base. Each bar 7 is linked to the upper frustoconical part 5a of the casing of the gearbox 5 by its upper end linked by a ball joint articulation 8 onto an anchoring lug 9 projecting laterally on the upper part 5a of the box 5, and each bar 7 is linked by its lower end to the transmission support platform 6 of the fuselage by a ball joint articulation 10 linking it to a structural support 11 of the fuselage, for example a structural attachment fitting.

Hence the assembly consisting of the rotor 1, of the mast 4 and of the main gearbox 5 is attached to the structure 6 by the set of oblique bars 7, the axes of which converge at a focal point F, around which the suspended assembly can oscillate.

The focal-point antivibratory suspension device also comprises a linking device 12, linking the bottom of the base 5b, of generally cylindrical shape, of the box 5 to the fuselage 6. This linking device 12 comprises one or more elastic links, shown diagrammatically at 13, allowing movements of the base 5b of the box 5 with elastic return in order to filter the vibration generated by rotation of the rotor 1, as well as a set of two rods 14, represented in FIG. 3, for transferring to the fuselage 6 the torque in reaction to the rotational drive torque of the rotor 1 and of the mast 4 by the main gearbox 5.

The two rods 14 are identical, parallel and extend in the same plane perpendicular to the axis of rotation A—A. The rods 14 are arranged longitudinally with respect to the helicopter and each of them has its front end linked by a ball joint articulation 15 onto one of two supports 16 diametrally opposed and projecting laterally on the base 5b of the box 5, the ball joint articulations 15 being centered in the transverse radial plane passing through the central axis A—A of the box 5 and perpendicular to the longitudinal axis X—X of the helicopter. At its rear end, each rod 14 is linked by a ball joint articulation 19 to one of two attachment fittings 20 respectively constituting structural supports of the transmission support platform 6 of the fuselage. The reaction torque is thus transmitted from the base 5b of the casing of the box 5 to the structure of the fuselage 6 by the parallel rods 14, one of which is working in tension and the other in compression, due to the fact that they are both arranged on the same side, toward the rear, of the diametral radial plane passing through the centers of the articulations 15 onto the lateral supports 16 of the box 5.

Perpendicularly to the longitudinal rods 14, the lateral suspension, that is to say the filtering of the transverse excitation, is provided by two elastomer studs 17, each constituting one of the two transverse elastic links of the linking device 12, each stud 17 being fixed, by one end, against one of the two lateral supports 16 respectively of the base 5b of the box 5 and, by its other end, against one respectively of two structural supports 18, diametrally opposed with respect to the axis of rotation A—A, on the transmission support platform 6 of the fuselage. These studs 17 thus provide the elastic link from the bottom of the box 5 to the structure 6 in the direction perpendicular to that of the rods 14, working in tension-compression. These studs 17 are elastically deformable and, in a known way, their elastic return tends to bring the box 5 back into its initial neutral position, while thus filtering the transverse excitation.

This device is very simple, compact and very accessible as it is clear of the bottom of the box 5, and of very low height on the transmission support platform, including only two articulations to the structure and two articulations to the box 5. It is also very reliable and economical.

The focal-point bidirectional suspension device of FIG. 4 comprises numerous members similar to those of the example of FIG. 3, and marked with the same references, and it is distinguished from the preceding example only by the following differences: instead of being articulated directly onto a structural support 20 of the fuselage 6, the rear end of each rod 14 is linked by the ball joint articulation 19 to a flexible bar 21, perpendicular to the rods 14, and itself linked by each of its two ends by a ball joint articulation 22 onto an attachment fitting 23 constituting a structural support of the fuselage 6. The flexible bar 21 may be of metal or a composite material, and each rod 14 is articulated at 19 in proximity to one of the articulations 22 respectively of the bar 21 onto the fuselage 6, the articulations 19 being arranged between the articulations 22, so as to obtain good longitudinal elasticity, that is to say elasticity along the longitudinal axis X—X of the helicopter, of the bar 21 at the same time as high strength of this bar in terms of bending. FIG. 4a shows the S-shaped deformation of the bar 21 under the torque forces transmitted by the base 5b of the gearbox to the rods 14, the upper rod of which in FIG. 4 is stressed in compression and the lower rod in tension, as indicated by the arrows in FIG. 4a.

FIG. 4b shows the deformation of the flexible bar 21 under longitudinal force stressing the main gearbox 5 and moving its base 5b rearward, loading the two rods 14 in compression. The longitudinal elasticity, depicted by FIG. 4b, is provided by the elastic deformation of the flexible bar 21, and it will be noted that the S-shaped deformations of the bar 21 greatly reduce the movements of the main gearbox 5 loaded with the torque.

In this example also, the lateral suspension is provided by the elastomer studs 17 forming the elastic links between the base 5b of the gearbox and the structure of the fuselage 6.

This device is also simple, compact and very accessible, and at the cost of a flexible bar and of two additional articulations, it exhibits the advantage of providing reliable and economical bidirectional suspension, without an elastomer stud for longitudinal return.

The combined suspension device, with focal-point lateral suspension and with antiresonant longitudinal suspension, of FIG. 5, is distinguished from the example of FIG. 4 only by the fixing of a mass 24 located on the middle of the flexible bar 21, so that the same references as before designate the similar elements. The mass 24 behaves like a flapping mass of the antiresonant suspension devices as described in the abovementioned patents, and makes it possible considerably to reduce the alternating reactions produced by the deformations of the flexible bar 21, carrying the mass 24, in the region of the attachment fittings 23 on the structure of the fuselage 6, while offering the possibility of increasing the rigidity of the bar 21, and thus its resistance to the torque forces stressing the main gearbox 5.

As the transmission support platform 6 of a helicopter is generally very cluttered, if it is not possible for the bar 21 to have appropriate dimensions, having regard to the space available for positioning it and its deformations, the variant of FIG. 6 can be adopted. In this variant, the bar 21 of FIGS. 4 and 5 is replaced by two levers 25, which are rigid and strong, and which are aligned end-to-end perpendicularly to the rods 14, and linked to one another in the region of their adjacent ends by a central articulation 26, which is not linked elastically to the gearbox 5 and onto which a concentrated mass 27 is fixed, corresponding to the mass 24 of FIG. 5. At its end opposite the articulation 26, each lever 25 is linked by a ball joint articulation 22 onto one of the two structural attachment fittings 23 respectively for linking to the fuselage 6. As in the preceding example, each of the rods 14 is linked at its rear end by a ball joint articulation 19 onto one of the two rigid levers 25 respectively, in the vicinity of the articulation 22 of the latter onto the corresponding attachment fitting 23. This variant makes it possible to dissociate the problem of the strength of the transverse bar, resolved by the choice of two rigid levers 25, from the problem of the longitudinal elasticity of the device, which is dissociated from the levers 25 and provided by two further elastomer studs 28, centered on the longitudinal axis X—X of the helicopter, and thus in the radial and diametral plane parallel to the rods 14, each of these studs 28 constituting an elastic link with longitudinal elastic return in the linking device between the bottom of the main gearbox 5 and the structure of the fuselage 6. To do that, each stud 28 is fixed between one of two structural supports 29 respectively of the fuselage 6, arranged on either side of the base 5b of the gearbox 5, and one of two lateral supports 30 respectively, diametrally opposed on this base 5b of the box 5, these lateral supports 30 possibly being diametrally opposed parts of the outer face of the gearbox casing. These studs 28 are stressed in tension compression and deform elastically to provide the longitudinal suspension. According to another variant, they could be arranged on either side of the central mass 27, each being fixed between this central mass 27 and one of two structural supports of the fuselage, so that these two longitudinal elastic links remain centered on the longitudinal axis X—X. It will be understood that, having regard to the high rigidity of the two levers 25, the movements of the gearbox 5 loaded in torque are practically nil. As in the preceding examples, the lateral suspension is provided by the two elastomer studs 17 constituting transverse elastic links.

FIG. 7 represents a variant of the device of FIG. 6, in which the concentrated mass 27 on the central articulation of the FIG. 6 is distributed in the parts 32 of the two rigid levers 31 by which these levers 31 are articulated onto one another by the central articulation 33. Each of the rigid levers 31 is, to this end, widened and thickened in its end part 32, in the vicinity of the central articulation 33. The strength of the levers 31 being thus ensured, it is possible to reduce the size of the device by linking the rear ends of the rods 14 by the articulations 19 to the ends of the levers 31, on the side opposite the central articulation 33, the articulations 22 of the levers 31 onto the structural attachment fittings 23 then being arranged between the two articulations 19, and each in proximity to the articulation 19 of the corresponding rod 14.

Moreover, the two lateral elastic links formed by the studs 17 and the two longitudinal elastic links formed by the elastomer studs 28 of FIG. 6 are integrated, in the variant of FIG. 7, into a single elastic link 34 linking the base 5b of the main gearbox to the fuselage 6.

This single elastic link 34 is represented in section in FIG. 8. It is mounted centered on the longitudinal axis X—X, in the diametral plane parallel to the rods 14, and between them. It is fixed to a lateral support 35 projecting outwards on the base 5b of the main gearbox, and consists, for example, of an extension of the lower flange 36 of the main gearbox. This elastic link 34 comprises two cylindrical elastomer studs 37 bonded by a flat base, one bonded onto the upper face and the other bonded onto the lower face of the support 35, and by their opposite flat bases the first one onto a "U"-shaped armature 38 and the second onto a flat armature 39, which are fixed, for example by bolting, onto one another and both onto a structural attachment on the structure of the fuselage 6. Each of the two studs 37 deforms elastically and provides elastic return, both lateral and longitudinal, working in shear mode, due to its sandwiched mounting between the support 35 of the gearbox and the stirrup fixed to the structure of the fuselage 6 and consisting of the armatures 38 and 39. An end stop limiting the deformations of the elastic link 35 can be provided in the form of a bolt 40 centered in the radial plane passing through the longitudinal axis X—X and fixed to the armatures 38 and 39 through which it passes, also passing through the studs 37 as well as the lateral support 35, with sufficient radial clearance to limit the deformation travel of the elastic link 34.

The elasticity of this link 34 is the same in the longitudinal direction and in the lateral direction. It is determined by the choice of the elastomer studs 37 for matching the lateral suspension, and the mass 32 of the levers 31 as well as the lever arms on the latter for the action of the rods 14 and that of the masses 32 are adapted so that the elasticity of the link 34 is also suited to the longitudinal suspension of the device.

In the examples, of FIGS. 6 and 7, it will be understood that the levers 25 and 31 elongate hypothetically when they are no longer aligned. This hypothetical elongation, very slight, has to be compensated for and absorbed by the central articulation 26 or 33. FIGS. 9 and 10 diagrammatically represent two examples of a central articulation which can be used for this purpose. In FIG. 9, the central articulation 33 of FIG. 7 consists of a clevis with two parallel branches 32a formed at the end of the widened and thickened part 32 of the lever 31 above the longitudinal axis X—X in FIG. 7, between which is engaged a lug 32b at the end of the thickened and widened part 32 of the lever 31 below the axis X—X in FIG. 7. The lug 32b is retained in the clevis of the branches 32a by a bolt 41, forming a pivoting spindle, with the interposition of a tubular elastomer member 42, elastically deformable, between the bolt 41 and the lug 32b, and forming a silentbloc.

In the variant central articulation of FIG. 10, it is again seen that the lug 32b of one of the levers 31 is engaged between the branches 32a of the clevis of the other lever 31, but with the interposition, between the lug 32b and each of the branches 32a, of one of two elastomer studs 43 respectively, fixed between the opposing faces and subject to shear in the event of misalignment of the levers 31. These studs 43, unlike the elastomer studs discussed previously, are laminated studs, that is to say consisting of an alternating stack of rigid plates and of layers of elastomer.

FIG. 11 represents an example of a combined suspension device, with focal-point lateral suspension and activated longitudinal suspension. This device is distinguished from that of FIG. 7 in that the two rigid levers 44 have no increased mass in their part adjacent to the central articulation 45, which supports no localized mass, but is articulated onto the free end of the rod 46 of a hydraulic jack 47, the cylinder 48 of which is articulated by its bottom at 49 onto a structural attachment fitting 50 of the fuselage 6. The articulations 45 and 49 are centered on the longitudinal axis X—X, parallel to the rods 14 in the plane perpendicular to the axis A—A and containing the rods 14 and the levers 44. The linear actuator constituted by this hydraulic jack 47 constitutes a recentering member longitudinally shifting the central articulation 45 of the levers 44, so that the longitudinal suspension of the device is active. The hydraulic jack 47 is, to this end, controlled by a servovalve (not represented) driven by electrical commands, at least equal in number to the number of blades of the rotor per rotation of the latter, these electrical commands being supplied by a computer, deriving them in terms of amplitude and phase from signals testifying, for example, to the alternating stresses in the rods 14 and delivered by stress sensors on these rods 14, and/or from the vibratory level measured in the helicopter cabin, by vibration sensors, arranged, for example, under the pilot's seat.

In a variant, the linear actuator 47 may be combined with (or replaced by) a spring 51, the forces of which are added to (or substituted for) those of the single elastic link 34, identical to that of the preceding example, as far as the longitudinal elasticity is concerned. For the rest, this device is identical to that of FIG. 7 as far as the mounting of the rods 14 on the levers 44 and the articulation of the latter onto the fuselage 6 is concerned.

In this context, it should be noted that the attachment fittings 23 for the levers 25, 31 or 44 of FIGS. 6, 7 or 11, or for the bar 21 of FIGS. 4 and 5, or the attachment fittings 20 for the rods 14 of FIG. 3 onto the structure of the fuselage 6 can be integrated with the fittings 11 for attaching the oblique bars 7 onto the structure of the fuselage 6 (see FIG. 1), for the two bars 7 toward the rear of the main gearbox 5.

It should also be noted that the single elastic link 34 with two elastomer studs 37 of FIGS. 7 and 11 can also be arranged to the front of the main gearbox 5, and such an elastic link 34 can also be used in the devices of FIGS. 3 to 6. Finally, the elastic link 34 of FIGS. 7 and 11 can be replaced by two pairs of elastic studs, such as 17 and 28 of FIG. 6, and the devices of FIGS. 3 to 5 may include a second pair of elastic studs such as 28 of FIG. 6.

I claim:

1. Device for antivibratory suspension of a helicopter rotor (1) on the fuselage (6) of the helicopter, on which the rotor (1) is integral in rotation with a mast (4) supported and driven in rotation about its axis (A—A) by a coaxial transmission gearbox (5), the suspension device comprising:

a set of at least three straight and rigid suspension bars (7), distributed around the transmission gearbox (5) and arranged obliquely with respect to the axis of rotation (A—A), so as to converge toward the axis of rotation (A—A), each bar (7) being linked by one end (8) to the transmission gearbox (5) and articulated (10) by its other end to a structural support (11) of the fuselage (6), and a device (12) linking the base (5b) of the transmission gearbox (5) to the fuselage (6), allowing transfer to the fuselage (6) of the torque in reaction to the torque driving the rotor (1) by the transmission gearbox (5) as well as the movements of the transmission gearbox (5) with respect to the fuselage (6) with flexibility in at least one direction perpendicular to the axis of rotation (A—A) in order to filter vibration between the rotor (1) and the fuselage (6), and comprising, on the one hand, two identical rods (14), substantially parallel and extending substantially in the same plane perpendicular to the axis of rotation (A—A), one end of each rod (14) being linked to a structural support (20) of the fuselage (6) while its other end is articulated (15) onto one of two lateral supports (16) respectively, fixed to opposite sides of the transmission gearbox (5), the rods (14) extending on the same side of a plane substantially parallel to the axis of rotation (A—A) and passing through the centers of the articulations (15) of the rods (14) onto the transmission gearbox (5), so that one of the rods is stressed in tension and the other in compression for transferring said reaction torque to the fuselage (6), and, on the other hand, at least one elastic link (13, 34) including at least one element for elastic return (17, 37) in at least said direction perpendicular to the axis of rotation (A—A) and also perpendicular to the rods (14), and fixed between a structural support (18, 38-39) of the fuselage (6) and a lateral support (16, 35) of the base (5b) of the transmission gearbox (5), characterized in that the ends of the rods (14) linked to structural supports (20) of the fuselage (6) are articulated directly (19) onto said structural supports (20).

2. Suspension device according to claim 1, in which said linking device (12) comprises at least one pair of elastic links (13) which are diametrally opposed with respect to the axis of rotation (A—A) and each comprising at least one element for elastic return (17) in the direction perpendicular to that of the rods (14), characterized in that each elastic link (13) is fixed onto one of the lateral supports (16) respectively of the transmission gearbox (5) on which one of the two rods (14) respectively is articulated (15).

3. Suspension device according to claim 2, characterized in that said linking device (12) comprises a second pair of elastic links (28), each comprising at is least one element for elastic return in the direction of the rods (14), each elastic link (28) of the second pair being fixed to one of two structural supports (29) respectively of the fuselage (6), which are arranged substantially in the radial plane passing through the axis of rotation (A—A) and parallel to the rods (14), each elastic link (28) also being fixed to one of two supports (30) respectively which are arranged laterally in diametrally opposed positions on the base of the transmission (5) gearbox (5b) or, as the case may be, on either side of the mass (27) and of the central articulation (26) of the levers (25).

4. Suspension device according to claim 1, characterized in that said linking device (12) comprises a single elastic link (34) including at least one element for elastic return (37) along the direction of the rods (14) and along the direction perpendicular to that of the rods (14), said return element (37) being fixed on a structural support (38-39) of the fuselage (6) arranged substantially in the radial plane parallel to the rods (14).

5. Suspension device according to claim 4, characterized in that the single elastic link (34) comprises two elastomer studs (37), working in shear mode, and fixed on either side of a common support (35) projecting laterally on the base (5b) of the gearbox (5), and each sandwiched between said common support (35) and one of two armatures (38, 39) respectively which are rigidly linked to an attachment fitting on the fuselage (6).

6. Suspension device according to claim 5, characterized in that the single elastic link (34) comprises at least one end stop (40) limiting the deformation of the studs (37) and including at least one bolt passing through the studs (37) and their armatures (38, 39) for fixing to said fitting, and, with clearance, the lateral support (35) of the transmission gearbox (5).

7. Device for antivibratory suspension of a helicopter rotor (1) on the fuselage (6) of the helicopter, on which the rotor (1) is integral in rotation with a mast (4) supported and driven in rotation about its axis (A—A) by a coaxial transmission gearbox (5), the suspension device comprising:

a set of at least three straight and rigid suspension bars (7), distributed around the transmission gearbox (5) and arranged obliquely with respect to the axis of rotation (A—A), so as to converge toward the axis of rotation (A—A), each bar (7) being linked by one end (8) to the transmission gearbox (5) and articulated (10) by its other end to a structural support (11) of the fuselage (6), and a device (12) linking the base (5b) of the transmission gearbox (5) to the fuselage (6), allowing transfer to the fuselage (6) of the torque in reaction to the torque driving the rotor (1) by the transmission gearbox (5) as well as the movements of the transmission gearbox (5) with respect to the fuselage (6) with flexibility in at least one direction perpendicular to the axis of rotation (A—A) in order to filter vibration between the rotor (1) and the fuselage (6), and comprising, on the one hand, two identical rods (14), substantially parallel and extending substantially in the same plane perpendicular to the axis of rotation (A—A), one end of each rod (14) being linked to a structural support (20) of the fuselage (6) while its other end is articulated (15) onto one of two lateral supports (16) respectively, fixed to opposite sides of the transmission gearbox (5), the rods (14) extending on the same side of a plane substantially parallel to the axis of rotation (A—A) and passing through the centers of the articulations (15) of the rods (14) onto the transmission gearbox (5), so that one of the rods is stressed in tension and the other in compression for transferring said reaction torque to the fuselage (6), and, on the other hand, at least one elastic link (13, 34) including at least one element for elastic return (17, 37) in at least said direction perpendicular to the axis of rotation (A—A) and also perpendicular to the rods (14), and fixed between a structural support (18, 38-39) of the fuselage (6) and a lateral support (16, 35) of the base (5b) of the transmission gearbox (5), characterized in that the ends of the rods (14) linked to structural supports (23) of the fuselage (6) are articulated (19) onto a flexible bar (21), each in the vicinity of one of two articulations (22) respectively by which the bar (21), substantially perpendicular to the rods (14), is articulated onto said structural supports (23).

8. Suspension device according to claim 7, characterized in that the flexible bar (21) carries a flapping mass (24) located at the middle thereof.

9. Suspension device according to claim 7, characterized in that the articulations (19) of the rods (14) onto the flexible bar (21) are arranged between the articulations (22) of the flexible bar (21) onto the structural supports (23) of the fuselage (6).

10. Suspension device according to claim 7, in which said lining device (12) comprises at least one pair of elastic links (13) which are diametrally opposed with respect to the axis of rotation (A—A) and each comprising at least one element for elastic return (17) in the direction perpendicular to that of the rods (14), characterized in that each elastic link (13) is fixed onto one of the lateral supports (16) respectively of the transmission gearbox (5) on which one of the two rods (14) respectively is articulated (15).

11. Suspension device according to claim 7, characterized in that said linking device (12) comprises a single elastic link (34) including at least one element for elastic return (37) along the direction of the rods (14) and along the direction perpendicular to that of rods (14), said return element (37) being fixed on a structural support (38-39) of the fuselage (6) arranged substantially in the radial plane parallel to the rods (14).

12. Device for antivibratory suspension of a helicopter rotor (1) on the fuselage (6) of the helicopter, on which the rotor (1) is integral in rotation with a mast (4) supported and driven in rotation about its axis (A—A) by a coaxial transmission gearbox (5), the suspension device comprising:

a set of at least three straight and rigid suspension bars (7), distributed around the transmission gearbox (5) and arranged obliquely with respect to the axis of rotation (A—A), so as to converge toward the axis of rotation (A—A), each bar (7) being linked by one end (8) to the transmission gearbox (5) and articulated (10) by its other end to a structural support (11) of the fuselage (6), and a device (12) linking the base (5b) of the transmission gearbox (5) to the fuselage (6), allowing transfer to the fuselage (6) of the torque in reaction to the torque driving the rotor (1) by the transmission gearbox (5) as well as the movements of the transmission gearbox (5) with respect to the fuselage (6) with flexibility in at least one direction perpendicular to the axis of rotation (A—A) in order to filter vibration between the rotor (1) and the fuselage (6), and comprising, on the one hand, two identical rods (14), substantially parallel and extending substantially in the same plane perpendicular to the axis of rotation (A—A), one end of each rod (14) being linked to a structural support (20) of the fuselage (6) while its other end is articulated (15) onto one of two lateral supports (16) respectively, fixed to opposite sides of the transmission gearbox (5), the rods (14) extending on the same side of a plane substantially parallel to the axis of rotation (A—A) and passing through the centers of the articulations (15) of the rods (14) onto the transmission gearbox (5), so that one of the rods is stressed in tension and the other in compression for transferring said reaction torque to the fuselage (6), and, on the other hand, at least one elastic link (13, 34) including at least one element for elastic return (17, 37) in at least said direction perpendicular to the axis of rotation (A—A) and also perpendicular to the rods (14), and fixed between a structural support (18, 38-39) of the fuselage (6) and a lateral support (16, 35) of the base (5b) of the transmission gearbox (5), characterized in that the ends of the rods (14) linked to structural supports (23) of the fuselage (6) are each articulated (19) onto one of two rigid levers (25) respectively, which are substantially aligned in the extension of one another and substantially perpendicular to the rods (14), and each articulated (22) onto one of the structural supports (23) respectively of the fuselage (6), close to the articulation (19) of said lever (25) on the corresponding rod (14), the two levers (25) being moreover articulated onto one another at their adjacent ends by a central articulation (26), between the rods (14), without elastic linking of the central articulation to the transmission gearbox.

13. Suspension device according to claim 12, in which said lining device (12) comprises at least one pair of elastic links (13) which are diametrally opposed with respect to the axis of rotation (A—A) and each comprising at least one element for elastic return (17) in the direction perpendicular to that of the rods (14), characterized in that each elastic link (13) is fixed onto one of the lateral supports (16) respectively of the transmission gearbox (5) on which one of the two rods (14) respectively is articulated (15).

14. Suspension device according to claim 12, characterized in that said linking device (12) comprises a single elastic link (34) including at least one element for elastic return (37) along the direction of the rods (14) and along the direction perpendicular to that of rods (14), said return element (37) being fixed on a structural support (38-39) of the fuselage (6) arranged substantially in the radial plane parallel to the rods (14).

15. Suspension device according to claim 12, characterized in that a concentrated mass (27) is fixed in the region of the central articulation (26) of the two levers (25).

16. Suspension device according to claim 12, characterized in that each of the two rigid levers (31) has an increased mass in its part (32) adjacent to the central articulation (33).

17. Suspension device according to claim 12, characterized in that the two rigid levers (44) are stressed, in the region of their central articulation (45), by at least one actuator (47) tending to shift the central articulation (45) in the direction of the rods (14).

18. Suspension device according to claim 17, characterized in that the actuator is a linear jack (47) mounted between the central articulation (45) of the two levers (44) and a structural attachment point (50) of the fuselage (6).

19. Suspension device according to claim 18, characterized in that the jack (47) is hydraulic and controlled by a servovalve, driven by electrical commands.

20. Suspension device according to claim 12, characterized in that the articulations (22) of the rigid levers (31, 44) on the corresponding structural supports (23) of the fuselage (6) are arranged between the articulations (19) of the rods (14) onto the levers (31, 44).

21. Suspension device according to claim 5, characterized in that the central articulation (33) comprises means (42, 43) for compensating for the misalignments of the two levers (31), such as at least one deformable elastomer element mounted between two parts (32a, 32b) which are articulated onto one another of the two levers (31).

* * * * *